United States Patent [19]

Sennari et al.

[11] 3,944,534
[45] Mar. 16, 1976

[54] GASEOUS-PHASE POLYMERIZATION OF OLEFINS

[75] Inventors: Mutsuo Sennari; Yoichiro Izumi; Taketoshi Fujita, all of Yokkaichi, Japan

[73] Assignee: Mitsubishi Petrochemical Company Limited, Japan

[22] Filed: Aug. 4, 1971

[21] Appl. No.: 168,896

[30] Foreign Application Priority Data
Aug. 8, 1970 Japan................................ 45-69542

[52] U.S. Cl................. 260/93.7; 23/285; 23/288 R; 260/94.9 B; 260/94.9 P
[51] Int. Cl.².......................... C08F 2/34; C08F 10/00
[58] Field of Search.......... 260/94.9 P, 94.9 B, 93.7; 23/288 R, 285

[56] References Cited
UNITED STATES PATENTS

| | | | |
|---|---|---|---|
| 3,508,882 | 4/1970 | Farnell................................ | 23/285 |
| 3,639,377 | 2/1972 | Trieschmann et al.......... | 260/94.9 B |

FOREIGN PATENTS OR APPLICATIONS

| | | | |
|---|---|---|---|
| 1,218,265 | 12/1966 | Germany....................... | 260/94.9 P |
| 1,226,659 | 3/1971 | United Kingdom................ | 260/93.7 |

Primary Examiner—Alan Holler
Attorney, Agent, or Firm—Robert E. Burns; Emmanuel J. Lobato; Bruce L. Adams

[57] ABSTRACT

Gaseous-phase polymerization of an α-olefin with a catalyst and without a liquid dispersant is carried out under the following conditions:

1. A solid phase comprising said catalyst and particulate olefin polymer is caused principally by mechanical agitation to undergo circulation in the up-and-down directions within a reaction chamber of substantially vertical-cylinder type, a reaction bed being formed by said circulating solid phase;
2. The ratio of the diameter to height of said reaction bed is of the order of from 1 : 0.5 to 1 : 3;
3. The starting-material α-olefin is supplied in liquid state into the reaction chamber from a point above the reaction bed and vaporized within the reaction chamber; and
4. Heat of polymerization reaction is removed principally by the latent heat of vaporization absorbed by said vaporization of the liquid α-olefin.

13 Claims, 4 Drawing Figures

GASEOUS-PHASE POLYMERIZATION OF OLEFINS

BACKGROUND OF THE INVENTION

This invention relates generally to polymerization of olefins and more particularly to a new process and apparatus for producing olefin polymers by polymerizing α-olefins in gaseous phase.

Throughout this disclosure, including the appended claims, the terms "polymerization" and "polymers" are intended to include "homopolymerization", "copolymerization" and "homopolymers", "copolymers", respectively.

Various methods of producing crystalline high-molecular polymers by catalytic polymerization of α-olefins such as ethylene and propylene have been proposed. The catalysts used in these methods, in general, are solids, and of these, various catalysts of excellent stereospecificity are known.

One typical example of these methods is that wherein an α-olefin is caused to contact a polymerization catalyst dispersed in a liquid organic dispersing agent. It may be considered that the α-olefin dissolves in this dispersing agent and thereby contacts the catalyst. Processes based on this method in which a so-called Ziegler type catalyst is used as the polymerization catalyst are being industrially practiced in some instances because of several advantages thereof such as facility in producing olefin polymers of good crystallinity and stereospecificity and facility in controlling the polymerization temperature.

On the other hand, however, the practice of this method on an industrial scale is accompanied by various problems such as the necessity of using a large quantity of a purified dispersing agent and the necessity of a chemical treatment step for removing catalyst residue from the polymer formed since the yield with respect to the catalyst, that is, the ratio of the quantity of the olefin polymer formed to the quantity of the catalyst or the catalyst component used, is not very high.

In addition to the above described so-called slurry polymerization method, a method wherein polymerization is accomplished by causing an α-olefin in a gaseous phase to contact a catalyst in the substantial absence of a liquid dispersing agent. This method is disclosed in the specification of Japanese Patent Publication Nos. 1,895/1958 and 9,892/1959. A process based on this method is, of course, free of the problems accompanying the use of a dispersing agent and can be considered to be a very economical process.

In this gaseous-phase process, the polymerization catalyst, which is generally a solid is used directly in its solid state, in a state wherein it is dispersed in a small quantity of a dispersing agent, in a state wherein it is borne on a carrier comprising a granular olefin polymer, an inorganic substance such as silica, alumina, titanium oxide, or calcium carbonate, or some other substance, or in some other suitable state and caused to contact the starting-material olefin in gaseous state. It can be easily surmised that the state of gas-solid contact in this process has a great effect on this polymerization process.

Accordingly, a number of proposals have heretofore been made relative to this point. For example, in one proposed process, a fludized bed is formed by a solid phase comprising particles of the olefin polymer formed and the catalyst and by the starting-material olefin.

By this process, however, a gas flow velocity of at least 5 to 6 cm/second is ordinarily necessary for causing the above mentioned solid phase to become fluid, whereby not only is the supply of a large quantity of the starting-material olefin necessary, but fine solid-phase particles (the inclusion in which of the catalyst must be taken into consideration) accompany the starting-material olefin rising in the fluidized bed and are thereby discharged out of the system. Furthermore, in addition to regions of rapid flow, regions of very slow flow readily occur in the fluidized bed. In the latter regions of sluggish flow, there is a tendency of the olefin polymer formed to collect and solidify to become lumps, whereby continuous operation over a long period necessary for industrial practice is not possible.

As an attempt to solve the above described problems accompanying this fluidized-bed process, a process wherein the flow velocity of the gas sent toward the fluidized bed is lowered by applying to the fluidized bed an auxilliary mechanical agitation or vibration thereby to prevent the scattering of the fine solid phase has been proposed. However, even by this process, the above described problems cannot be completely solved.

More specifically, probably because of the decrease in the gas flow velocity, the porous or sieve-like partition for preventing fluid solids from dropping within the reaction vessel or the gas suction inlet is clogged with fine solid particles whereby the gas dispersion becomes irregular, or the flow of the gas is stopped. The resulting ununiform state of the fluidization gives rise to irregularities in the fluidized bed temperature or to agglomeration and solidification of olefin polymers.

SUMMARY OF THE INVENTION

It is an object of this invention to provide a process and apparatus for accomplishing gaseous-phase polymerization of olefins with high efficiency and without the accompaniment of the above described difficulties. We have found that this object and other objects of this invention can be achieved by a mode of operation of specific limitations as described hereinafter.

According to this invention in one aspect thereof, briefly summarized, there is provided an improved process for gaseous-phase polymerization of an α-olefin in contact with a catalyst substantially without a liquid dispersing agent, the process being characterized in that it is carried out under the following conditions:

1. A solid phase comprising said catalyst and particulate olefin polymer is caused principally by mechanical agitation to undergo circulation in the up-and-down directions within a reaction chamber of substantially vertical-cylinder type, a reaction bed being formed by said circulating solid phase;

2. The ratio of the diameter to height of said reaction bed is of the order of from 1 : 0.5 to 1 : 3;

3. The starting-material α-olefin is supplied in liquid state into the reaction chamber from a point above the reaction bed and vaporized within the reaction chamber; and 4. Heat of polymerization reaction is removed principally by the latent heat of vaporization absorbed by said vaporization of the liquid α-olefin.

According to this invention in another aspect thereof, there is provided apparatus for the above described gaseous-phase polymerization of an α-olefin, which apparatus comprises: a reaction chamber of substantially vertical cylinder type for effecting contact between a gaseous-phase α-olefin and a solid-phase comprising a polymerization catalyst and a particulate olefin polymer; a solid-phase circulation mechanism for circulating said solid phase in the up-and-down directions within said reaction chamber, said mechanism not extending to the top part of the reaction chamber; a device for supplying liquid α-olefin provided within the reaction chamber above said solid-phase circulation mechanism; and an extraction device for extracting gaseous-phase α-olefin from the reaction chamber.

The nature, utility, and further features of this invention will be more clearly apparent from the following detailed description beginning with a consideration of general aspects and feature of the invention and concluding with specific examples of practice illustrating preferred embodiments of the invention.

DETAILED DESCRIPTION

Figure 1:
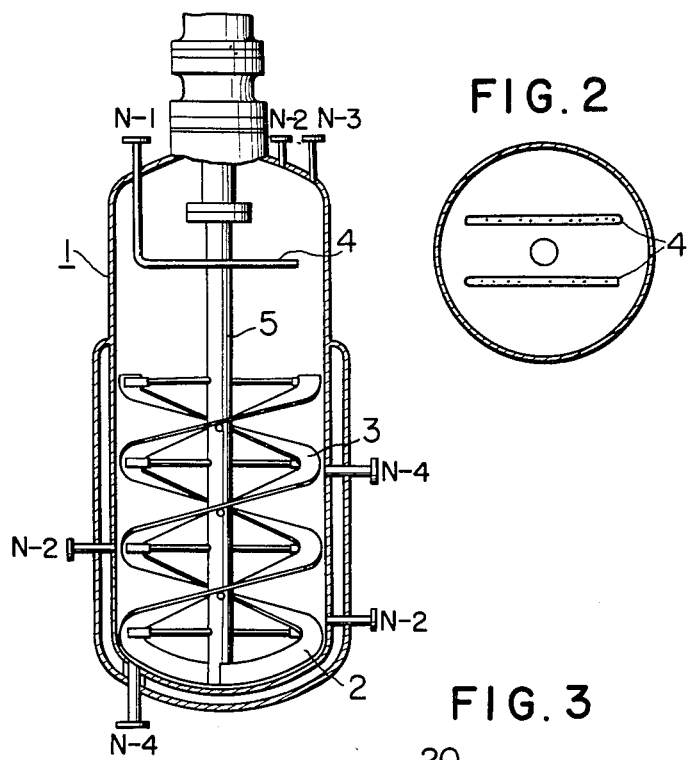
FIG. 1 is an elevational view, partly in vertical section, showing one specific example of the apparatus according to this invention.

In accordance with this invention, instead of rendering a solid phase comrpising a catalyst and a particulate olefin polymer into the state of a fluidized bed by means of a gaseous-phase olefin, contact of the two phases is brought about by mechanical agitation. Moreover, this mechanical agitation is attained by a specific mode of operation, that is, by causing the above mentioned solid phase to circulate in the up-and-down directions. In this manner, the objects of this invention are achieved.

By the practice of this invention, undesirable occurrences which impair the production operation, such as adhesion of solid particles within the reaction chamber, agglomeration or lumping of the reactants, clogging of parts such as partition plates and gas blowing nozzles, and scattering of fine particles outside of the reaction chamber, and which have been conspicuous as problems of the prior art are prevented. Furthermore, since a fluidized bed is not necessary, an ordinary vessel-type reactor can be used instead of a relatively large reactor for a fluidized bed.

This invention can be practiced, in general, by causing a solid phase comprising a polymerization catalyst and a particulate olefin polymer to circulate in the up-and-down directions by mechanical agitation within a reaction chamber of a substantially vertical-cylinder type thereby to contact a gaseous-phase olefin.

The term "a reaction chamber of substantially vertical-cylinder type" is herein used to specify a reaction chamber having substantially circular cross sections perpendicular to a certain axis which, moreover, is substantially vertical. The length of "cylinder", i.e., the height of this vertical-cylinder type reaction chamber, is not necessarily large relative to the diameter thereof.

It is necessary that this reaction chamber be capable of withstanding the pressures imposed thereon during the polymerization of α-olefins. Furthermore, it must have various openings in addition to those described hereinafter. Another requirement is that this reaction chamber be of a nature such that a jacket for a coolant or a heating medium can be provided on its outer part.

The component of the solid phase referred to as a "particulate olefin polymer" is ordinarily a polymer prepared separately at the time of starting of the polymerization reaction and has function as a catalyst carrier. As the reaction progresses, the olefin polymer formed undoubtedly comes to occupy the predominant parts of the solid phase. Furthermore depending on the necessity, this solid phase may contain, in addition to the above mentioned two indispensable components, solid particles which are soluble, insoluble, meltable or unmeltable.

As mentioned briefly hereinbefore, this solid phase circulates within the reaction chamber with and up-and-down flow pattern. One of the two most typical flow patterns which can be used is that of a downward flow in the region near the central axis of the vertical-cylinder reaction chamber and an upward flow along and in the vicinity of the inner surface of the cylindrical side wall of the chamber (flow pattern A). The other typical flow pattern is that of an upward flow in the central-axis region and a downward flow along and near the side wall of the chamber (flow pattern B).

In either of these patterns, the descending movement of the solid phase is preferably caused by the free fall thereof in the gaseous olefin. Accordingly, for establishing a pattern of this nature, any apparatus capable of causing particulate bodies to rise can be used. A rotary type agitation device is advantageous in that imparting of agitation energy is readily possible thereby. Accordingly, for creating the above described flow pattern A, a ribbon-agitator type apparatus is suitable, while a screw-agitator type apparatus is suitable for creating the flow pattern B. The up-and-down circulation of the solid phase may be accompanied by a rotational flow relative to the axis of agitation.

An apparatus of this character for up-and-down circulation is designed to have a limited height and to have a certain space in the upper part of the reaction chamber. This space is for accommodating a device for injecting the starting material olefin, while the limitation of the height of the circulation apparatus is necessary for maintaining the conditions relating to the size of the reaction bed as described hereinbelow.

The solid phase which circulates in this manner forms a certain agglomerate mass. That is, when the solid phase in the flow patterns A and B ascends or descends as it contacts the inner wall surface of the reaction chamber, a mass of a substantially vertical-cylinder shape of a diameter equal to the inner diameter of the reaction chamber and height corresponding to that of the solid-phase circulation apparatus is formed. Furthermore, in the case where an inner cylinder is provided within the reaction chamber, and a mass is formed within the inner cylinder, the inner diameter of the inner cylinder will become the diameter of the mass.

This mass is contact with the gaseous-phase olefin, in itself, constitutes the reaction bed of the polymerization reaction, and, in accordance with this invention, this reaction bed is so arranged that its diameter-to-height ratio is within the range of appreximately from 1 : 0.5 to 1 : 3, preferably from 1 : 0.8 to 1 : 2. The fact that the height of the reaction bed does not exceed 3 times the diameter can be said to indicate, indirectly, that this reaction bed is not a fluidized bed.

In the calculation of this ratio, the term "height" designates the distance from the lower end to the upper end of the reaction bed, while the term "diameter" designates the value of the diameter of the true circle of the same area as the cross section of the reaction bed in the case where the cross section thereof is not a true circle. In accordance with this invention, the height of the reaction bed is ordinarily of the order of from 60 to 80 percent of the height of the reaction chamber.

The starting material α-olefin is introduced by injecting it in liquid state toward the reaction bed from a point thereabove.

This injection of the olefin is advantageously accomplished by the use of one or more nozzles provided with a large number of small orifices directed in optimum directions so that the olefin thus introduced disperses and contacts substantially in a liquid state the reaction bed, particularly the upper surface of the reaction bed. Each nozzle may be of any suitable shape such as an annular shape, a disk shape, or a straight-line shape.

While the distance betwen the nozzle or nozzles and the upper surface of the reaction bed is not subject particularly to any specification, it is desirable that this distance be of a value such that a portion or all of the liquid-state olefin thus supplied contacts the reaction bed surface substantially in its liquid state. Accordingly, in addition to supplying the α-olefin from a point above the reaction bed, a portion thereof may be supplied directly into the reaction bed.

Control of the polymerization temperature is accomplished principally by continuous or non-continuous injection of the liquid α-olefin and preferably by the vaporization thereof in the reaction bed. For high efficiency of the reactor, the operation thereof is preferably carried out under conditions wherein the quantity of the olefin necessary for producing latent heat of vaporization required for removal of the heat of polymerization is generally greater than the supplied quantity of the olefin necessary for sustaining the polymerization reaction. Accordingly, in order to maintain the pressure of the reaction chamber at a specific constant value, gaseous-phase olefin is continuously or non-continuously extracted.

While this extraction of gaseous-phase olefin is ordinarily carried out through a discharge port provided exclusively for this purpose at the upper part of the nozzle for injecting the starting material olefin in liquid state, it is also possible to carry out a part or all of this extraction together with the extraction of the olefin polymer produced in particulate state as described hereinafter.

It is desirable that this extraction of the gaseous-phase olefin be carried out in a manner such that it is not accompanied by unintended particulate olefin polymer, or that the up-and-down mechanical circulation of the solid phase is not impaired. The olefin thus extracted can be liquefied and supplied again to the reaction chamber.

While it is possible to remove the heat of polymerization sufficiently by utilizing the latent heat of vaporization of this liquefied olefin, it is also possible if necessary to install an auxiliary cooling device outside or inside of the reaction chamber. Perhaps the most common type of cooling device for this purpose is a jacket installed around the exterior of the reaction chamber and provided with passageways for flow of a coolant therethrough.

In the case of continuous polymerization reaction, it is necessary to take the particulate olefin polymer product out of the reaction chamber in a continuous or non-continuous manner and to introduce the polymerization catalyst into the reaction chamber also in a continuous or non-continuous manner.

The extraction of the particulate olefin polymer product from the reaction chamber is relatively simple. Since the reaction chamber is pressurized, in general, an opening with a valve is provided in the vicinity of the position where the solid phase of the reaction chamber exists, whereby, when the valve is opened, the particulate olefin polymer is ejected together with the gaseous-phase olefin.

While the polymerization catalyst may be introduced in the form of a catalyst prepared beforehand, in the case where the catalyst comprises several components as in a Ziegler type catalyst, for example, the components are introduced into the reaction chamber separately or in previously combined groups of certain components thereby to form the final catalyst system within the reaction chamber.

In any case, it is possible to introduce the catalyst or a catalyst component into the reaction chamber by dissolving or dispersing the same in a small quantity of an inert solvent or by causing the same to be borne on a solid carrier such as, for example, a particulate olefin polymer or an inorganic substance such as silica, alumina, titanium oxide, or calcium carbonate.

In the introduction of the catalyst, the introduced catalyst or catalyst component is dispersed uniformly in the reaction bed principally by mechanical agitation. It is desirable, however, that in addition the catalyst or component be already dispersed uniformly within the reaction bed at the inlet, for example, in the state of a mist by a liquid or gas.

The olefin polymer thus produced is in a particulate state of a particle diameter of the order of from 0.01 to 5 mm., representative diameters being from 0.1 to 1 mm. This polymer may be used directly without removing the catalyst. Depending on the necessity, the catalyst is removed by a common procedure, and then any of various auxiliary materials such as a stabilizer, moldability agent, blending resin, and filler are added depending on the use, whereupon the final product is obtained.

APPARATUS

While the aforedescribed circulation of the solid phase comprising the polymerization catalyst and the particulate olefin polymer can be accomplished by any of the various modes described before, we have found that optimum circulation can be attained through the use of a circulation device of the ribbon agitator type.

The ribbon agitator per se is known and ordinarily has one or more ribbon vanes fixedly mounted on a rotating shaft. Since the function of the ribbon vanes is to cause the particulate solid phase to rise, it is preferably of continuous construction from the bottom to the top. However, if desired, these vanes may be structures which are split at intermediate parts thereof. It is desirable that these ribbon vanes be of a size such that the clearance between their outer peripheral parts and the inner wall surface of the reaction chamber is made as small as possible.

Figure 4:
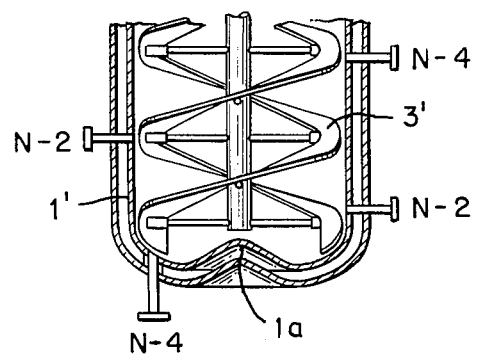
FIG. 4 is a partial elevational view, partly in vertical section, of a variation of the apparatus illustrated in FIG. 1.

When a ribbon-agitator type circulation device is used, the solid phase assumes the aformentioned flow pattern A. Accordingly, it is necessary, in general, to cause the particulate solid phase which has fallen to the vicinity of the lower part of the agitator shaft to be borne on the ribbon vane positioned near the inner wall surface of the reaction chamber. It is desirable, therefore, to extend the lower end part of each ribbon vane in conformance with the contour of the bottom of the reaction chamber to a point in the vicinity of the agitator shaft, to provide anchor-shaped agitator blades at the lower part of the ribbon vanes, or, as illustrated in FIG. 4, to provide inwardly projecting projection 1a for example, conical projection at the bottom part of the reaction chamber thereby to cause the solid phase which has descended to migrate toward the inner surface of the the reaction chamber wall.

In a specific example of the apparatus according to this invention as illustrated in FIG. 1, there is provided a reaction chamber constituting the principal structure thereof. This reaction chamber is in the form of a vertical cylindrical tank with dished upper and lower ends and is provided with at least an inlet N-1 for introduction of a liquid α-olefin, inlets N-2 for introduction of a catalyst, a circulation gas outlet N-3 an outlet N-4 for extraction of the particulate olefin polymer product, and a ribbon vane 3 mounted on a vertical agitator shaft 5 and driven by a motor (not shown) as essential parts.

While the agitator shaft 5 in this example extends downward into the chamber 1 through a sealing gland at the top thereof, it may alternatively extend upward through a sealing gland at the bottom. As still another modification, a ribbon vane without a central shaft may be used. While an agitator blade 2 having an anchor shape conforming to the shape of the dish-shape bottom of the reaction chamber 1 is provided at the lower part of the ribbon vane 3, this lower part can be modified in a number of ways.

Figure 2:
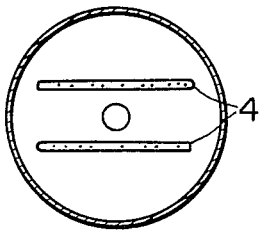
FIG. 2 is a cross section of the apparatus shown in FIG. 1 as view upward to show one specific example of nozzles for injecting a liquid α-olefin.

The aforementioned inlet N-1 for introduction of the liquid α-olefin communicate with a nozzle 4 for injection of the liquid α-olefin. This nozzle in the instant example is in the form of two parallel tubes, as shown in FIG. 2, each having a plurality of minute orifices. The number, size, and positions of these orifices are determined by the distance between the nozzle and the reaction bed and the diameter of the reaction bed. It is desirable that these orifices have a configuration such that the liquid α-olefin will be readily injected as a fine spray or mist.

OPERATION

Figure 3:
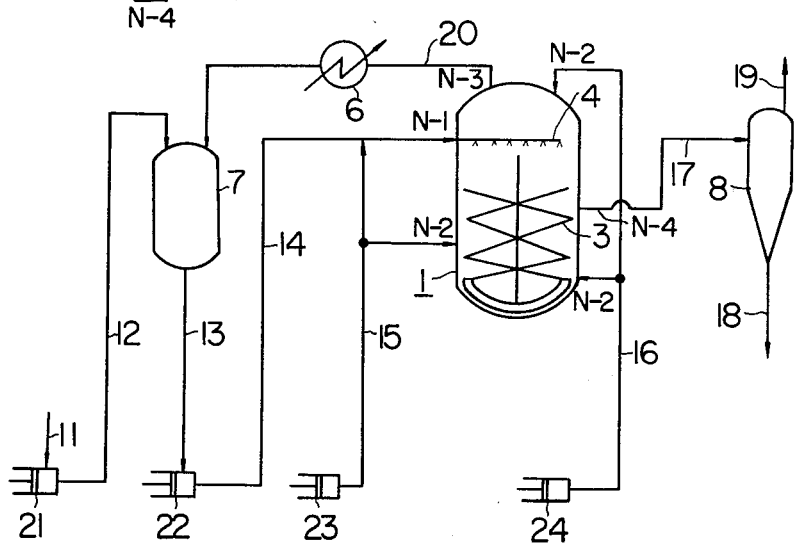
FIG. 3 is a flow sheet indicating one example of practice of the gaseous-phase polymerization of an olefin according to the invention.

One specific example of practice of the olefin gaseous-phase polymerization according to the invention is indicated by the flow sheet in FIG. 3.

An α-olefin from a line 11 is transferred by a pump 21 to a liquid α-olefin reservoir 7, where the olefin is first stored temporarily. From the bottom of the reseroir 7, liquid α-olefin is drawn by a pump 22 through a line 13 and delivered through a line 14 to be introduced through the inlet N-1 of the aforedescribed reaction chamber 1 and thereby injected through the nozzle 4. The liquid α-olefin thus injected is vaporized in the reaction bed. A portion of the liquid α-olefin may be supplied directly into the reaction bed through another separate nozzle.

A portion, or a component, or all of the catalyst is pumped by a pump 24 through a line 16 to be charged into the reaction chamber 1 through the inlet N-2 at the top thereof and (or) through the inlet N-2 in the side wall thereof. Depending on the necessity, a portion, or a component, of the catalyst is charged by a pump 23 through a line 15 into the aforementioned line 14 for supplying liquid olefin or directly into the chamber 1 through an inlet N-2 in the side wall thereof, thereby into the reaction bed. It is desirable that this charging of the catalyst or a portion thereof be carried out by a method such that it is dispersed uniformly and instantaneously by the inlet into the reaction bed.

When, with the progress of the polymerization reaction, the level of the reaction bed reaches a predetermined position, the particulate olefin polymer formed is extracted and transferred through a line 17 to a separator 8 by utilizing pressure difference. The particulate olefin polymer and the accompanying gas are separated in the separator 8 and taken out through lines 18 and 19, respectively.

The α-olefin which has been excessively vaporized in order to cause it to generate latent heat of vaporization is released, for example, by a pressure-regulating valve (not shown) and extracted through a line 20 from the reaction chamber 1 to be liquefied in a condenser 6. The olefin thus liquefied is returned to the reservoir 7.

While the velocity at which the liquid α-olefin is injected through the nozzle 4 and the rotational speed of the ribbon agitator is determined by the temperature which is to be maintained within the reaction chamber and the allowable temperature distribution, the injection velocity is ordinarily of the order of from 100 to 2,000 mm/second, while the agitator rotational speed is of the order of from 5 to 120 rpm., which corresponds to a vane peripheral velocity of the order of from 0.5 to 10 meters/second.

While the polymerization temperature is not subject especially to any restriction except that it be lower than the softening temperature of the α-olefin polymer to be formed, it is ordinarily from 30° to 150°C, preferably from 50° to 120°C. The polymerization pressure may of any value within a range wherein the α-olefin within the reaction chamber can exist in the gaseous phase, practical pressure, ordinarily being from atmospheric pressure to 100 atmospheres, preferably of the order of from 20 to 80 atmospheres.

The essential requirement for the polymerization catalyst is that it be capable of causing the α-olefin to polymerize in the gaseous phase at a polymerization temperature below the softening point of the α-olefin polymer to be formed and of converting the α-olefin into a crystalline polymer. Examples of such a catalyst are those disclosed in the specifications of the aforementioned Japanese Patent Publication Nos. 1,895/1958 and 9,892/1959.

Of these catalysts, the so-called Ziegler-type catalysts are suitable, particularly solid catalysts comprising combinations of alkylaluminum compounds and titanium compounds. Examples of such alkylaluminum compounds are tri-lower alkylaluminums and lower alkylaluminum halides. Examples of such titanium compounds are halogen compounds, lower alkoxy compounds, and lower alkoxy halogen compounds.

Various modifications of these catalysts are possible for the purpose of improving their polymerization activity, stereospecificity, and the other properties and (or) for changing the shapes of the polymers formed.

Accordingly, it is to be understood that such modified catalysts are also usable in the practice of this invention.

While there is no special limitation with respect to the method of preparing the catalyst and the method of introducing the catalyst into the reaction chamber, it is preferable to introduce the catalyst in the following manner. A catalyst component or a catalyst prepared is dispersed or dissolved in a small quantity of a liquid inert organic solvent (for example, a hydrocarbon such as propane, butane, pentane, hexane, cyclohexane, benzene, and heptane) or in the liquid α-olefin to participate in the reaction, and the resulting dispersion or solution is introduced continuously into the reaction chamber at one part or several parts thereof by means of a pressurizing metering pump in a manner such that the catalyst component or prepared catalyst system is dispersed instantaneously at the charging inlet into the reaction bed.

It is preferable, of course, in the case of a catalyst system, such as trialkylaluminum and fine activated titanium trichloride, which readily undergoes change (particularly a lowering of polymerization activity) with the elapse of time when prepared before-hand outside of the reaction chamber, to introduce the catalyst components separately into the reaction chamber. Furthermore, it is desirable in all cases of catalyst systems of multiple components that they be introduced in a manner such that they are dispersed uniformly in the reaction bed to form the catalyst. It is also possible at the time of start-up of the operation to cause the catalyst system to be borne on particulate olefin polymer to form the reaction bed.

While the gaseous-phase polymerization of olefins according to this invention can be practiced, of course by a batch process, the use of a continuous process is advantageous.

Examples of α-olefins to which this invention is applicable are ethylene, propylene, and butene-1, either singly or as a mixture. Furthermore, in order to adjust the molecular weight, it is also possible to add to the α-olefin a small quantity of a known agent for adjusting molecular weights of gases, such as hydrogen, hydrogen chloride, and lower hydrocarbon halides.

In order to indicate still more fully the nature and utility of this invention, the following specific examples of practice constituting preferred embodiments of the invention, comparison examples, and results are set forth, it being understood that the example are presented as illustrative only, and that they are not intended to limit the scope of the invention.

EXAMPLE 1

Continuous gaseous-phase polymerization of propylene was carried out with the use of a catalyst comprising titanium trichloride and triethylaluminum in a weight ratio of 1 : 4, under a reaction pressure of 35 atmospheres, at a reaction temperature of 85°C, and by means of a system as illustrated in FIG. 3.

A reactor corresponding to that shown in FIG. 1 was used. The ratio of the diameter to the height of this reactor was 1 : 2.4, and the ratio of the polypropylene reaction bed height to the reactor diameter was 1.2 : 1. Furthermore, the reactor was provided therein with an agitator vane of double-ribbon type of a diameter equal to 0.98 times that of the reactor, a ribbon width equal to 0.1 times the reactor diameter, and a helical pitch equal to 0.75 times the reactor diameter. This agitator vane was operated at 60 rpm. to impart principally up-and-down flow in the axial directions to the polypropylene within the reactor.

The reaction temperature was maintained by extracting a portion of the reaction gas from the top of the reactor, cooling and liquefying this gas in a heat exchanger with water at room temperature, and then spreading liquefied propylene uniformly at a velocity of approximately 700 mm./second over the free surface of the polypropylene reaction bed through a spray nozzle for atomizing liquefied propylene. The quantity of the propylene circulated for this temperature control was 5.6 parts relative to 1 part of the propylene formed.

By this procedure, it was easily possible to control the temperature distribution within the reaction bed to within 2°C, and, with respect to 1 part of the titanium trichloride, from 14,000 to 16,000 parts of a particulate polypropylene was obtained. The fraction insoluble in boiling heptane of this polypropylene was from 78 to 83 percent by weight.

After 700 hours of continuous operation, the reactor was opened and inspected, whereupon it was observed that there was no adhesion or lumping of the polypropylene whatsoever on the reactor wall, the agitator vane, and the propylene charging inlet. Furthermore, there was no scattering of polypropylene powder toward the propylene gas outlet. Accordingly, it was apparent that further continuous operation over a long period was possible.

EXAMPLE 2

Gaseous-phase polymerization of propylene was carried out with the use of a catalyst comprising titanium trichloride and diethyl-aluminum chloride in a ratio by weight of 1 : 3, under a reaction pressure of 35 atmospheres, at a reaction temperature of 85°C, and by means of the same reactor and apparatus system as in Example 1.

For control of the molecular weight of the polymer product, 1.2 percent by volume of hydrogen was added to the propylene introduced into the reactor.

By this procedure, it was easily possible to control the distribution of temperature within the reaction bed within 2°C, and from 3,200 to 3,800 parts of a particulate polypropylene with respect to one part of the titanium trichloride was obtained. The fraction insoluble in boiling heptane of this polypropylene was from 92 to 94 percent by weight.

After 700 hours of continuous operation, the reactor was opened and inspected. As a result, it was found that there was no adhesion or lumping of the polypropylene whatsoever on the reactor wall, the agitator vane, and the propylene charging inlet. Furthermore, there was no scattering of polypropylene powder toward the propylene gas outlet. Accordingly, it was apparent that further continuous operation over a long period was possible.

EXAMPLE 3

Continuous gaseous-phase polymerization of ethylene was carried out under a reaction pressure of 40 atmospheres, at a temperature of 80°C, and with the use of a catalyst comprising titanium trichloride and triethylaluminum in a ratio by weight of 1 : 4.

The reactor and apparatus system used were similar to those specified in Example 1 except that the cooling of the ethylene circulated for removing heat was accomplished by using a refrigerator and cooling and liquefying the gaseous ethylene at −15°C by by means of a heat exchanger.

By this procedure, it was easily possible to control the distribution of temperature in the reaction bed within 2°C, and from 18,000 to 22,000 parts of a particulate polyethylene with respect to one part of the titanium trichloride was obtained.

After 700 hours of continuous operation, the reactor was opened and inspected. As a result, it was found that there was no adhesion or lumping of the polyethylene whatsoever on the reactor wall, the agitator vane, and the ethylene charging inlet. Furthermore, there was no scattering of polypropylene powder toward the ethylene gas outlet. Accordingly, it was apparent that further continuous operation over a long period was possible.

COMPARISON EXAMPLE 1

This is a comparison example with respect to Example 1 according to the practice of this invention.

Gaseous-phase polymerization of propylene was carried out under a reaction pressure of 35 atmospheres, at a reaction temperature of 85°C, and with the use of a catalyst comprising titanium trichloride and triethylaluminum in a ratio by weight of 1 : 4.

The procedure of this Comparison Example 1 differed from that of Example 1 in that the propylene to participate in the reaction and the liquid propylene for heat removal which was supplied for maintaining the reaction temperature were charged into the reactor through a nozzle provided in the bottom thereof.

By the above described procedure, the temperature distribution within the reaction bed exceeded 10°C, and lumps of polypropylene were found to have formed within the reactor. Furthermore, polypropylene was adhering to the charging inlet for propylene, and further operation became impossible after 100 hours of continuous operation.

COMPARISON EXAMPLE 2

This is another comparison example with respect to Example 1 according to the practice of this invention.

Continuous gaseous-phase polymerization of propylene was carried out under a reaction pressure of 35 atmospheres, at a temperature of 85°C, and with the use of a catalyst comprising titanium trichloride and triethylaluminum in a ratio by weight of 1 : 4.

The procedure of this Comparison Example 2 differed from that of Example 1 in that a different agitator vane was used. More specifically, an anchor-type agitator vane of a diameter equal to 0.98 times the reactor diameter, a vane width equal to 0.1 times the reactor diameter, and a height equal to 1.5 times the reactor diameter was used and operated at 60 rpm. to impart a flow principally in the circumferential direction to the polypropylene within the reactor.

By this process, the temperature distribution with the reaction bed reached a value above 20°C, and because of adhesion, agglomeration, and lumping of the polypropylene, further operation after 12 hours of polymerization became impossible.

We claim:

1. In the production of an olefin polymer by contacting an α-olefin in a gaseous phase with a polymerization catalyst substantially in the absence of a liquid dispersing agent thereby to casue said α-olefin to undergo gaseous-phase polymerization, the improved process wherein said polymerization is carried out under the following conditions:
   1. a solid phase comprising said catalyst and particulate olefin polymer is caused principally by mechanical agitation to undergo circulation in the up-and-down directions within a reaction chamber of substantially vertical-cylinder type, a reaction bed being formed by said circulating solid phase;
   2. the ratio of the diameter to height of said reaction bed is of the order of from 1 : 0.5 to 1 : 3
   3. substantially all the starting-material α-olefin is supplied in a liquid state into the reaction chamber from a point above the reaction bed and vaporized within the reaction chamber; and
   4. heat of said polymerization reaction is removed principally by the latent heat of vaporization absorbed by said vaporization of the liquid α-olefin.

2. A process for producing an olefin polymer as claimed in claim 1 in which any remaining portion of said starting-material α-olefin is introduced in a liquid state into said reaction bed.

3. A process for producing an olefin polymer as claimed in claim 1 in which, during the progress of the polymerization, the catalyst is supplied to the polymerization system by dispersing the same in the liquid start-material α-olefin.

4. A process for producing an olefin polymer as claimed in claim 1 in which, during the progress of the polymerization, the catalyst is supplied to the polymerization system by dispersing the same in a liquid inert solvent.

5. A process for producing an olefin polymer as claimed in claim 1 in which the α-olefin is propylene.

6. A process for producing an olefin polymer as claimed in claim 1 in which the α-olefin is ethylene.

7. Apparatus for gaseous-phase polymerization of olefins comprising a reaction chamber of substantially vertical cylinder type for effecting contact between a gaseous-phase α-olefin and a solid-phase comprising a polymerization catalyst and a particulate olefin polymer; a solid-phase circulation mechanism for circulating said solid phase in the up-and-down directions within said reaction chamber, said mechanism not extending to the top part of the reaction chamber; a device for supplying liquid α-olefin to said solid-phase, provided within the reaction chamber, spaced above said solid-phase circulation mechanism out of contact therewith, said device for supplying liquid α-olefin being comprised of at least one nozzle provided with a plurality of small orifices so directed that the olefin thus supplied is dispersed and contacts the reaction bed substantially in the liquid state; an extraction device disposed in said reaction chamber above the level of said device for supplying liquid α-olefin for extracting gaseous-phase α-olefin from the reaction chamber, whereby extraction of said solid phase with said gaseous α-olefin is substantially avoided and a device disposed in said reaction chamber for supplying said cataylst to said solid phase disposed in the top and/or a side wall of said reaction chamber.

8. Apparatus for gaseous-phase polymerization of olefins as claimed in claim 7 in which said solid-phase circulation mechanism is a ribbon-type agitator so shaped that the particulate solid phase which has fallen near the lower part of the central axis of the reaction chamber is borne upward near the inner surface of the cylindrical side wall of the chamber, and in which said reaction chamber is provided with outlet means for withdrawing particulate olefin polymer product.

9. A process as claimed in claim 1, in which said α-olefin in the liquid state is injected into the reactor by means of at least one nozzle provided with a plurality of orifices to direct and disperse the α-olefin in a liquid state onto the reaction bed.

10. A process as claimed in claim 1 in which at least part of said excess α-olefin in the gas phase is extracted from said reaction chamber at a point above the point where said α-olefin is supplied in a liquid phase to said solid phase, whereby the removal of particulate α-olefin polymer with the thus extracted gaseous α-olefin is substantially avoided.

11. Apparatus according to claim 7 in which said circulation mechanism is a ribbon type agitator, the lower end part of each ribbon vane being extended so as to conform with the contour of the bottom of the reaction chamber.

12. Apparatus according to claim 7 in which said circulation mechanism is a ribbon type agitator provided with anchorshaped agitator blades at the lower part of the ribbon vanes.

13. Apparatus according to claim 7 in which said circulation mechanism is a ribbon type agitator and in which said reaction chamber is provided with inwardly projection protuberance at its bottom part, to cause descended solid to migrate toward the inner surface of the reaction chamber wall.

* * * * *